Aug. 30, 1938.  C. A. MARIEN  2,128,372
PISTON RING
Filed Feb. 16, 1938
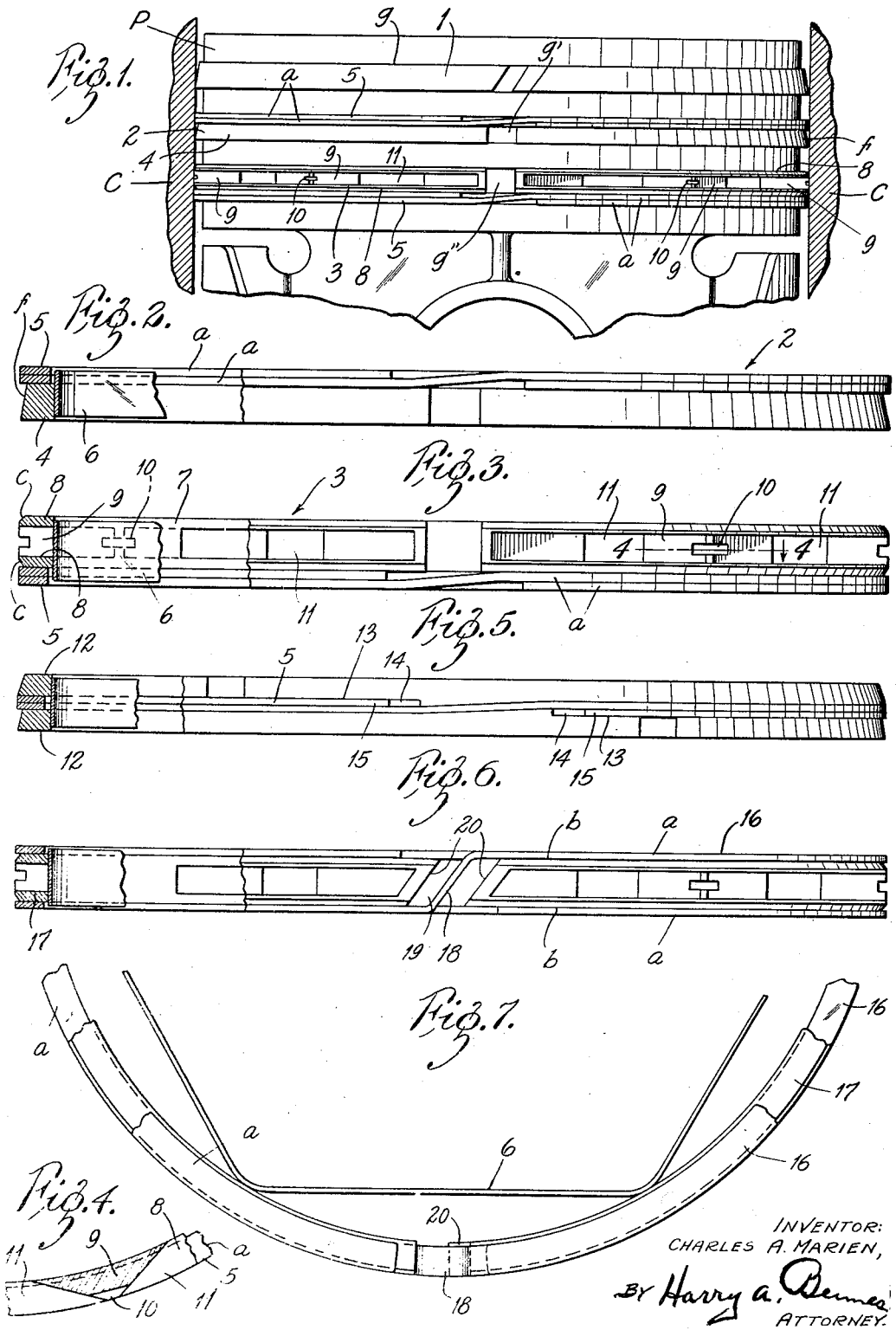
INVENTOR:
CHARLES A. MARIEN,
BY Harry A. Bennes
ATTORNEY.

Patented Aug. 30, 1938

2,128,372

UNITED STATES PATENT OFFICE

2,128,372

PISTON RING

Charles A. Marien, St. Louis, Mo., assignor to Ramsey Accessories Manufacturing Corporation, St. Louis, Mo., a corporation of Missouri Application February 16, 1938, Serial No. 190,759

6 Claims. (Cl. 309—45)

My invention has relation to improvements in piston rings and it consists in the novel features of construction more fully set forth in the specification and pointed out in the claims.

While the present invention is primarily adapted for use with pistons within internal combustion engines, it is equally applicable in many instances to other types of engines and compressors.

The primary object of the invention is to devise a piston packing ring that will hold compression in the cylinder and at the same time control the flow of oil over the cylinder wall without an excessive amount of friction such as will produce scoring of the cylinder wall. The modern tendency in the design of automobile engines has been constantly toward higher compressions and higher speeds, which has greatly taxed the ingenuity of the piston ring manufacturers, as a piston ring of a given design may be entirely adequate to hold compression and prevent oil pumping in an engine operating at a given compression and a given number of R. P. M. but will fail badly with a slight increase in the compression or number of revolutions per minute. It is the purpose of the present invention to satisfy all the requirements of a piston ring in an engine operating under compressions and at speeds in excess of present practice so that the ring may be serviceable even though these compressions and speeds are exceeded. Obviously, the ring must also be serviceable at lower compressions and lower speeds as well. In other words, it must be efficient throughout the entire range of performance of the engine in which it is installed.

The object of a ring of this construction is to provide a seal that will prevent passage of oil and gas between the face of the ring and the cylinder wall and also seal the groove so that gas and oil cannot pass behind the ring.

It is not practical to make a steel helical ring to seat perfectly on the side of the groove. However, a conventional cast iron ring can be accurately machined with minimum tolerances, allowing the ring to seat accurately on the side of the groove and permitting accurate axial width and accurate spacing in the groove. Thus, the use of the cast iron machined ring prevents leakage behind the ring.

One of the faults of the conventional cast iron ring is that the ring ends will collapse at high speeds and allow leakage past the face of the ring. The use of the helical steel ring in combination avoids this.

The two convolution helical ring is made of steel strip and can be thought of as a single convolution with ends extending one-half way around the circumference, eliminating two ordinarily unsupported ends which would tend to collapse and which would not remain part of a true circle when the diameter increases due to working in a tapered cylinder. The helical ring, as it unwinds in a tapered cylinder maintains as a whole, a true, firmly supported circle except at the ends. However, the part of the helix adjacent to the ends is solid and circular which causes the helix to be effective in preventing the passage of blow-by and excessive oil.

I have evolved such a ring by combining in various ways a thin steel helical ring with a cast iron ring, either of the compression or oil type, and have accomplished results heretofore incapable of accomplishment.

The present invention is a continuation in part of that shown in my co-pending application, Serial No. 167,680, filed October 7, 1937, except that a two-coil spiral steel ring is utilized as the oil scraper element instead of the flat steel ring shown in said application. I am fully aware that both the thin steel element and the spiral element are old in the art, the former being shown in Patent No. 2,091,947 and the latter in Patent No. 1,165,084. However, instead of a ring of dished shape, I employ a perfectly flat helix, as I have discovered that in practice the outer edges of the dished ring cause excessive wear on the groove in which the ring is lodged, ultimately destroying the shape of the groove with deleterious effects. The same objection applies to a helical ring which exerts lateral pressure against the sides of the ring groove due to its expansive effect therein. In my improved ring the assembly of the respective components rests loosely (without excessive play) in the piston ring groove so that all contacting surfaces will have an oil film between them to allow for free movement of the respective elements without wear on the contacting surfaces.

These features, as well as other advantages possessed by the invention, will be better apparent from a detailed description of the invention in connection with the accompanying drawing, in which:

Figure 1 is a side elevation of the upper part of a piston equipped with two different forms of my improved piston ring; Fig. 2 is a combined side elevation and cross section of my invention embodied in a compression-type piston ring; Fig. 3 is a combined side elevation and cross section of the invention embodied in an oil-type piston ring; Fig. 4 is a cross-sectional detail on the line 4—4 of Fig. 3; Fig. 5 is a modification of the invention adapted for use primarily as a compression ring; Fig. 6 is a further modification of the invention primarily adapted for use as an oil ring; and Fig. 7 is a plan view of a segment of the ring shown in Fig. 6.

Referring to the drawing, P represents a piston operable within a cylinder C. The piston has a series of ring grooves $g$, $g'$, $g''$ in which are disposed, respectively, an ordinary compression ring 1, a compression ring 2 according to my invention, and an oil-type ring 3 embodying the principles of the present invention. The compression ring 2 (illustrated on an enlarged scale in Fig. 2) is a compound ring consisting of a plain cast iron tapered face ring element 4, over which is disposed a steel element 5 coiled in the shape of a helix.

In the present instance, two flat coils $a$, $a$, which are comparatively thin (about $\frac{1}{32}''$), comprise the ring element 5 which is assembled in the groove $g'$ with the ring element 4 with lateral play or clearance, so that the ring elements 4 and 5 may expand and contract freely as they pass over the cylinder wall during the operation of the piston. The compound ring made up of the elements 4 and 5 has a spring inner ring or expander 6 associated with it, but initially only in contact with the element 4 for the purpose of augmenting the tension of the ring element 4 to increase the unit pressure of the tapered face $f$ against the cylinder wall.

As may be seen from Fig. 2, the depth of the ring element 5 is less than that of the element 4 so that the expander 6 will not contact with the element 5 until the face $f$ has worn down to a depth equal to the depth of the element 5. This feature of the invention is similar to that of my co-pending application, Serial No. 167,680, and is not claimed herein except in the specific combinations shown.

In the compression-type ring shown in Fig. 2, the thin steel helical element 5 is disposed on top of the cast iron element 4 to better hold the compression within the cylinder; while in the oil-type ring about to be described, the steel helical element 5 is disposed below the cast iron element 7. The cast iron element 7 is similar in construction to the cast iron element of my pending application aforesaid in that it has cylinder contacting components 8, 8 maintained in fixed spaced relation by triangular shaped pillars 9, across the apex of each of which is a kerf 10 to enable oil to flow readily from one oil passage 11 to that next adjacent.

However, the cast iron ring element 7, in the present instance, has the outer edges of the cylinder contacting components 8, 8 chamfered as shown at $c$, $c$, which reduces the area of the surface initially in contact with the cylinder wall and thereby increases the unit pressure. At the same time, the lower chamfer $c$ greatly facilitates the operation of inserting the piston into the cylinder. Without the chamfer $c$, the sharp edge presented is often injured by contact with the cylinder as the ring and piston are inserted into the cylinder.

In the modification shown in Fig. 5, the compound ring consists of a steel helical element 5 nested between two plain steel elements 12, 12, in the opposing side faces 13, 13 of which are formed off-sets 14, 14 for the end portions 15, 15 of the helical element to permit the helical element to lie in intimate contact with the outer plain ring elements 12, 12.

In the modification shown in Figs. 6 and 7, a helical ring 16 is entwined about a cast iron ring 17, said helical ring being made up of two coils $a$, $a$, each lying against one of the side faces $b$, $b$ of the cast iron ring, the inclined connecting portion 18 of the coils $a$, $a$ passing through a gap 19 in the cast iron ring. Obviously, the gap 19 of the cast iron ring is of such width that when the ring is contracted in use, there will be a slight clearance between the inclined faces 20, 20 in the ring ends and the inclined portion 18 of the ring 16. The ring 17 is an oil-type ring similar to ring 7, shown in Fig. 3, but a compression-type ring, such as the ring 4 shown in Fig. 2, may be combined with the helical ring 16 with equally advantageous results.

In all the forms of the invention herein illustrated and described, it will be observed that the helical ring is composed of two thin steel coils; whereas, in my pending application, Serial No. 167,680, the thin steel ring is made up of a single coil. The advantage of the two-coil helical construction is that it possesses greater inherent tension so that at very high engine speeds, it responds instantly to the irregularities in the cylinder and remains in intimate contact with the cylinder wall at all times. When this helical ring is combined with a cast iron ring, as illustrated, a compound ring is produced that is effective in holding compression and in controlling the oil flow within the cylinder over the entire range of engine speeds that the modern automobile engine is capable of and under the high compression ratios at which such engines operate.

The advantage of a helical ring over a plain flat ring as shown in my application Ser. No. 167,680 is that it is possible to use a helical ring of greater diameter than the diameter of the cylinder. In installing such ring the ring winds in the manner of a watch spring so that its diameter may be reduced sufficiently for installation in the cylinder, after which it expands against the cylinder wall with sufficient pressure to fit the wall closely at all points. In using a steel ring composed of a single loop the shape thereof, although circular before contraction, is distorted to an oval shape when contracted for subsequent expansion against the cylinder wall, while the helical ring maintains its circular shape and also is capable of conforming to the shape of out-of-round cylinders.

In my improved combination ring the full advantages of the helical ring are obtained on account of the freedom of movement said ring has within the groove as heretofore pointed out. Helical rings used alone, as disclosed in the prior art, are ineffective for holding compression because of the gap in the helix which permits "blow-by". However, when the helical ring is combined with the plain cast ring or an oil-type ring the path for the "blow-by" is shut off and the full efficiency of the helical ring is realized. In order to obtain these results the helical ring must be flat so as to lie squarely against the cast iron ring and without impingement on the side walls of the piston ring groove—in other words, the entire ring combination must be free to float with the oil film serving as the medium and at the same time assisting in holding compression.

A recapitulation of some of the advantages of my improved ring will show the following:

1. The ring conforms to out-of-round cylinders to lie in intimate contact with the cylinder wall throughout the entire circumference thereof.

2. The ring is capable of efficient performance over a limited range of cylinder sizes since it is capable of expanding to a diameter considerably beyond that of the cylinder. In short, my improved ring fits over-sized cylinders.

3. My improved ring is capable of controlling oil at high piston speeds.

4. It prevents "blow-by."

5. These advantages become cumulative when a compression-type of cast iron ring is combined with the helical ring for one groove of the piston and combined with an oil-type cast iron ring for a lower groove of the piston. As illustrated in the drawing, most advantageous results are obtained in this combination when the helical ring is disposed above the compression-type ring and below the oil-type ring.

The advantages of the helical steel component offsets the faults of the conventional cast iron ring. Conversely, the cast iron component offsets the disadvantages of the helical steel component. The combination of the two brings about an outstanding and desired result.

Having described my invention, I claim:

1. A two-part piston packing made up of a thin helical steel ring and a cast iron ring in juxtaposition therewith, all the coils of the helix lying on the same side of the cast iron ring.

2. A two-part piston packing made up of a thin helical steel ring of two coils and a cast iron ring in juxtaposition therewith, both coils of the helix lying on the same side of the cast iron ring.

3. A compound piston packing made up entirely of a thin helical steel ring and a cast iron ring in juxtaposition therewith, all the coils of the helix lying on the same side of the cast iron ring, the cast iron ring being of greater axial depth than the steel ring, and a spring expander within the compound ring and initially exerting its tension on the cast iron ring.

4. A compound ring assembly consisting of a flat ribbon steel helical ring member having the coils thereof in contiguity, a vented ring member immediately adjacent to said helical ring member, and an expander within the ring assembly and in contacting relation with one of said ring members.

5. A compound piston packing made up entirely of a helical steel ring having relatively thin coils in contiguity, a cast iron ring in juxtaposition therewith, and a spring expander arranged in contacting relation with the cast iron ring.

6. A compound piston packing made up entirely of a helical steel ring having relatively thin coils in contiguity, a vented ring in juxtaposition therewith, and a spring expander arranged in contacting relation with the vented ring.

CHARLES A. MARIEN.